US008853291B2

(12) United States Patent
Kawabe et al.

(10) Patent No.: US 8,853,291 B2
(45) Date of Patent: Oct. 7, 2014

(54) CURABLE RESIN COMPOSITION, CURED ARTICLE THEREOF, AND OPTICAL MATERIAL

(75) Inventors: Masanao Kawabe, Kitakyushu (JP); Tsugutoshi Wasano, Kitakyushu (JP); Tsuyoshi Miyata, Kitakyushu (JP)

(73) Assignee: Nippon Steel & Sumikin Chemical Co., Ltd., Tokyo (JP)

( * ) Notice: Subject to any disclaimer, the term of this patent is extended or adjusted under 35 U.S.C. 154(b) by 0 days.

(21) Appl. No.: 13/580,917

(22) PCT Filed: Feb. 24, 2011

(86) PCT No.: PCT/JP2011/054105
§ 371 (c)(1),
(2), (4) Date: Sep. 7, 2012

(87) PCT Pub. No.: WO2011/105473
PCT Pub. Date: Sep. 1, 2011

(65) Prior Publication Data
US 2012/0329899 A1    Dec. 27, 2012

(30) Foreign Application Priority Data

Feb. 26, 2010   (JP) ................................. 2010-042297

(51) Int. Cl.
*C08F 220/10* (2006.01)
*C08F 265/06* (2006.01)
*G02B 1/04* (2006.01)

(52) U.S. Cl.
CPC ..................................... *G02B 1/041* (2013.01); *C08F 265/06* (2013.01)
USPC ............. 522/33; 522/184; 522/186; 525/309; 525/451; 526/319; 526/328; 526/329

(58) Field of Classification Search
USPC ................... 522/33, 184, 186; 525/309, 451; 526/319, 328, 329
See application file for complete search history.

(56) References Cited

U.S. PATENT DOCUMENTS 5,792,822 A * 8/1998 Miyabayashi et al. ........ 526/240

FOREIGN PATENT DOCUMENTS

| JP | 58-198510 A | 11/1983 |
|---|---|---|
| JP | 63-81301 A | 4/1988 |
| JP | 63-167301 A | 7/1988 |
| JP | 63-199302 A | 8/1988 |
| JP | 2-133415 A | 5/1990 |
| JP | 2-213801 A | 8/1990 |
| JP | 7-216027 A | 8/1995 |
| JP | 8-165315 A | 6/1996 |
| JP | 11-246647 A | 9/1999 |
| JP | 2003-306619 A | 10/2003 |
| JP | 2003-329801 A | 11/2003 |
| JP | 2007-297526 A | 11/2007 |
| JP | 2008-247978 A | 10/2008 |
| WO | WO-2008/123199 A1 | 10/2008 |

OTHER PUBLICATIONS

Matsuo, Yuichiro; JP 2003-306619 machine English translation (Oct. 2003).*
International Preliminary Report on Patentability for the Application No. PCT/JP2011/054105 mailed Sep. 27, 2012.
International Search Report for the Application No. PCT/JP2011/054105 mailed Apr. 12, 2011.

* cited by examiner

*Primary Examiner* — Micheal Pepitone
(74) *Attorney, Agent, or Firm* — Cheng Law Group, PLLC

(57) ABSTRACT

Provided is a curable resin composition which has excellent optical properties, heat resistance, transparency, low water absorbability, and mold release property in molding, and reduces the occurrence of a burr from a mold. Also provided are a cured product thereof and an optical material. The curable resin composition includes: a component (A): a soluble polyfunctional (meth)acrylic acid ester copolymer which is obtained by copolymerizing components including a monofunctional (meth)acrylic acid ester (a) having an alicyclic structure, a bifunctional (meth)acrylic acid ester (b), and 2,4-diphenyl-4-methyl-1-pentene (c), has a reactive (meth)acrylate group derived from (b) in a side chain and a structural unit derived from (c) at an end, has a Mw of 2,000 to 20,000, and is soluble in an organic solvent; a component (B): a polyfunctional (meth)acrylate; and a component (C): an initiator, in which the blending amounts (weight ratio) of the respective components are as follows: (B)/(A)=5 to 250/100, and (C)/[(B)+(A)]=0.1 to 10/100.

12 Claims, No Drawings

CURABLE RESIN COMPOSITION, CURED ARTICLE THEREOF, AND OPTICAL MATERIAL

CROSS REFERENCE TO RELATED APPLICATIONS

The present application is a 371 application of PCT/JP2011/054105, filed Feb. 24, 2011, which is based on Japanese Patent Application No. 2010-042297 filed on Feb. 26, 2010, the entire contents of which are hereby incorporated by reference into the present application.

TECHNICAL FIELD

The present invention relates to a curable resin composition excellent in moldability, which has excellent optical properties, heat resistance, transparency, low water absorbability, and mold release property in molding, and reduces occurrence of a burr from a mold, a cured product thereof, and an optical article.

BACKGROUND ART

In recent years, plastic materials have been used in a wide range of applications because of their characteristics such as easy molding processing and lightness. Particularly important performances required in an optical member such as an optical lens include a high Abbe's number, a low specific gravity, moldability, heat resistance, light resistance, high hardness, low water absorbability, and distortion accuracy of a molded article.

Conventionally, such kind of lens has been molded by a method such as a press method or a cast method. The former, i.e., the press method is low in productivity because production is performed by a cycle of heating, pressurizing, and cooling. Meanwhile, the latter, i.e., the cast method has problems in that polymerization is performed by pouring a monomer in a mold, which elongates a production time, and many molds are required, which increases a production cost. In order to solve such problems, various proposals on use of a UV light curable resin composition have been made (Patent Literatures 1 and 2).

A method of producing a transmission type screen by using such UV light curable resin composition has been successful to some extent. However, such conventional resin composition has problems such as poor adhesion to a substrate and poor mold release property from a mold. When the resin composition has poor adhesion, the kind of the substrate which may be used is limited, resulting in a difficulty in obtaining intended optical properties. When the resin composition has poor mold release property, it becomes impossible to use the mold because the resin remains in the mold when being released from the mold. In addition, there are also problems in that a resin composition having good adhesion can adhere to a mold sufficiently, and hence is liable to have poor mold release property, while a resin composition having good mold release property is liable to have poor adhesion. Therefore, it has been desired to provide a resin composition which satisfies both performances of the adhesion to a substrate and mold release property from a mold.

For example, Patent Literature 3 proposes an active energy ray curable resin composition having an oxetane ring, describing that the resin composition is excellent in mold release property, but does not disclose the adhesion to a substrate.

Patent Literature 4 proposes a UV light curable resin composition obtained by blending a (meth)acrylate-based monomer in a polymer having specified refractive index and molecular weight. The literature describes that the resin composition including a methyl methacrylate-based (co)polymer as a major component is excellent in adhesion to a substrate, but does not disclose its mold release property.

Patent Literature 5 discloses that a molded plastic lens has good heat resistance. However, the heat resistance disclosed in the literature was evaluated by allowing the lens to stand in a constant temperature room at a temperature of 70° and a humidity of 60% for 24 hours and then observing its outer appearance such as its shape and whitening. Therefore, with regard to the heat resistance under an extremely severe environment of more than 260° C. in solder reflow required for an optical member used in an advanced technology field, a molded lens produced in accordance with a technology disclosed in the literature is not suitable in actual use because the lens undergoes a change in color and a reduction in spectral transmittance under a severe temperature condition owing to the fact that the lens contains a urethane bond.

Patent Literature 6 discloses a photosensitive resin composition for optical use including a polymer substance containing a structural unit including a carbon-carbon double bond in its molecular side chain and a (meth)acrylate. However, the polymer substance containing a structural unit including a carbon-carbon double bond in its molecular side chain, disclosed in this patent literature, has insufficient water absorbability as an optical member used in an advanced technology field and has industrially insufficient mold release property. Further, the patent literature does not suggest that introduction of an end group having a specific structure into the polymer substance can significantly improve properties such as low absorbability and mold release property, and it has been impossible to imagine the fact.

Further, Patent Literature 7 discloses a photosensitive resin composition for a hard-coating agent, which contains a compound (A) having at least two ethylenically unsaturated groups in a molecule, a polymer compound (B), and a photopolymerization initiator (C). However, the polymer compound (B) has no polymerizable group and has problems in reactivity, strength, and heat resistance.

CITATION LIST

Patent Literature

[PTL 1] JP 63-167301 A
[PTL 2] JP 63-199302 A
[PTL 3] JP 11-246647 A
[PTL 4] JP 8-165315 A
[PTL 5] JP 2-213801 A
[PTL 6] JP 63-81301 A
[PTL 7] JP 2003-306619 A

SUMMARY OF INVENTION

The present invention has been made in view of the above-mentioned circumstances, and an object of the present invention is to provide a curable resin composition containing a vinyl group-containing copolymer obtained from a polyfunctional monomer, in particular, a curable resin composition which can be molded and cured into a cured product that can be used as an excellent optical material which has excellent optical properties, heat resistance, transparency, low water absorbability, and mold release property in molding, and reduces the occurrence of a burr from a mold. Another object of the present invention is to provide an excellent curable resin composition which has excellent optical properties, heat resistance, transparency, low water absorbability, and mold release property in molding, and reduces the occurrence of a burr from a mold, a cured product thereof, and an optical material.

The inventors of the present invention have made intensive studies to achieve the objects, and as a result, have found that the objects can be achieved with a curable resin composition having a specific composition, thus completing the present invention.

The present invention is a curable resin composition, including: a component (A): a soluble polyfunctional (meth)acrylic acid ester copolymer which is obtained by copolymerizing components including a monofunctional (meth)acrylic acid ester (a) having an alicyclic structure, a bifunctional (meth)acrylic acid ester (b), and 2,4-diphenyl-4-methyl-1-pentene (c), has a reactive (meth)acrylate group derived from the bifunctional (meth)acrylic acid ester (b) in a side chain and a structural unit derived from 2,4-diphenyl-4-methyl-1-pentene (c) at an end, has a weight-average molecular weight of 2,000 to 20,000, and is soluble in toluene, xylene, tetrahydrofuran, dichloroethane, or chloroform;
a component (B): a polyfunctional (meth)acrylate; and
a component (C): an initiator,
wherein a blending amount of the component (B) is 5 to 250 parts by weight with respect to 100 parts by weight of the component (A), and a blending amount of the component (C) is 0.1 to 10 parts by weight with respect to a total of 100 parts by weight of the blending amount of the component (B) and a blending amount of the component (A).

The monofunctional (meth)acrylic acid ester (a) having an alicyclic structure is preferably exemplified by one or more kinds of monofunctional (meth)acrylic acid esters selected from the group consisting of isobornyl methacrylate, isobornyl acrylate, cyclohexyl methacrylate, cyclohexyl acrylate, dicyclopentenyl acrylate, dicyclopentenyloxyethyl acrylate, dicyclopentanyl acrylate, dicyclopentenyloxyethyl methacrylate, dicyclopentenyloxyethyl methacrylate, and dicyclopentanyl methacrylate.

The bifunctional (meth)acrylic acid ester (b) is preferably exemplified by one or more kinds of bifunctional (meth)acrylic acid esters selected from the group consisting of cyclohexanedimethanol diacrylate and dimethyloltricyclodecane diacrylate.

The present invention is also a resin cured product, which is obtained by curing the curable resin composition, and is an optical material, which is formed from the resin cured product.

DESCRIPTION OF EMBODIMENTS

Hereinafter, a curable resin composition of the present invention and components to be blended in the composition are described in detail. The curable resin composition of the present invention includes components (A) to (C).

The component (A) is a soluble polyfunctional (meth)acrylic acid ester copolymer. Hereinafter, the soluble polyfunctional (meth)acrylic acid ester copolymer is sometimes abbreviated as "copolymer."

The component (A) is a soluble polyfunctional (meth)acrylic acid ester copolymer which is obtained by causing monomers including (a) a monofunctional (meth)acrylic acid ester having an alicyclic structure and (b) a bifunctional (meth)acrylic acid ester, and (c) 2,4-diphenyl-4-methyl-1-pentene to coexist and copolymerizing the monomers, and has a reactive (meth)acrylate group derived from the bifunctional (meth)acrylic acid ester (b) in a side chain and a structural unit derived from 2,4-diphenyl-4-methyl-1-pentene (c) at an end. Here, the expression "soluble" means that the copolymer is soluble in toluene, xylene, tetrahydrofuran, dichloroethane, or chloroform. A solubility test is carried out under the conditions shown in Examples.

The copolymer is obtained by copolymerizing a monofunctional (meth)acrylic acid ester having an alicyclic structure and a bifunctional (meth)acrylic acid ester and hence has a branched structure or a crosslinked stricture. However, the amount of such structure is limited to a level which allows solubility to be exhibited. Therefore, the copolymer is one which has a structural unit (b1) containing an unreacted (meth)acrylic group derived from the bifunctional (meth)acrylic acid ester (b) in its side chain. The unreacted (meth)acrylic group is also referred to as "pendant (meth)acrylic group" and is polymerizable. Therefore, when the group is subjected to a further polymerization treatment, the group is polymerized or copolymerized with the component (B) to give a resin cured product insoluble in a solvent.

Further, the copolymer has a structural unit derived from 2,4-diphenyl-4-methyl-1-pentene (c) at the end. When the structural unit is introduced into the end of the copolymer, it is possible to obtain a curable resin composition which gives a cured product having improved molding proccessability such as mold release property.

The copolymer has a structural unit derived from the monofunctional (meth)acrylic acid ester (a) having an alicyclic structure, a structural unit derived from the bifunctional (meth)acrylic acid ester (b), and a structural unit derived from 2,4-diphenyl-4-methyl-1-pentene (c). Here, the structural unit derived from the bifunctional (meth)acrylic acid ester (b) includes a structural unit (b2) which includes polymerizable double bonds (referred to as vinyl groups) contained in the two (meth)acrylic acid esters, both of which are involved in polymerization to form a branched structure or a crosslinked structure and a structural unit (b1) which includes only one vinyl group which is involved in polymerization and another vinyl group which remains as an unreacted (meth)acrylic group. 2,4-Diphenyl-4-methyl-1-pentene (c) serves as a chain transfer agent to prevent an increase in the molecular weight and is present at the end of the copolymer.

The amount of 2,4-diphenyl-4-methyl-1-pentene (c) introduced into the copolymer is, as a mole fraction $M_c$ represented by the following equation (1), 0.02 to 0.35, preferably 0.03 to 0.30, particularly preferably 0.05 to 0.15.

$$M_c = (c)/[(a)+(b)+(c)] \tag{1}$$

Here, (a), (b), and (c) represent mole numbers of the structural unit derived from the monofunctional (meth)acrylic acid ester (a) having an alicyclic structure, the structural unit derived from the bifunctional (meth)acrylic acid ester (b), and the structural unit derived from 2,4-diphenyl-4-methyl-1-pentene (c), respectively. When the structural unit derived from 2,4-diphenyl-4-methyl-1-pentene (c) is introduced into the end of the copolymer in the above-mentioned range, it is possible to improve mold release property and low water absorbability.

The bifunctional (meth)acrylic acid ester (b) plays important roles as a crosslinking component for branching or crosslinking a copolymer, generating a pendant vinyl group to give curability to the copolymer, and curing a resin composition containing the copolymer to express heat resistance.

As the bifunctional (meth)acrylic acid ester, there may be used a bifunctional (meth)acrylic acid ester such as cyclohexanedimethanol diacrylate, dimethyloltricyclodecane diacrylate, cyclohexanedimethanol dimethacrylate, dimethyloltricyclodecane dimethacrylate, ethylene glycol diacrylate, propylene glycol diacrylate, 1,4-butanediol diacrylate, hexanediol diacrylate, diethylene glycol diacrylate, ethylene glycol diacrylate, propylene glycol diacrylate, 1,4-butanediol dimethacrylate, hexanediol dimethacrylate, or diethylene glycol dimethacrylate. However, the bifunctional (meth)acrylic acid ester is not limited thereto.

Suitable specific examples of the bifunctional (meth)acrylic acid ester include cyclohexanedimethanol diacrylate and dimethyloltricyclodecane diacrylate in view of cost, easiness in polymerization control, and heat resistance of a polymer to be obtained.

The monofunctional (meth)acrylic acid ester (a) having an alicyclic structure is important for improving the solubility in a solvent, low water absorbability, heat resistance, optical properties, and proccessability of the copolymer. Examples of such monofunctional (meth)acrylic acid ester having an alicyclic structure may include one or more kinds of monofunctional (meth)acrylic acid esters each having an alicyclic structure and selected from the group consisting of isobornyl methacrylate, isobornyl acrylate, cyclohexyl methacrylate, cyclohexyl acrylate, dicyclopentenyl acrylate, dicyclopentenyloxyethyl acrylate, dicyclopentanyl acrylate, dicyclopentenyloxyethyl methacrylate, dicyclopentenyloxyethyl methacrylate, and dicyclopentanyl methacrylate. However, the monofunctional (meth)acrylic acid ester is not limited thereto. When the structural units derived from the components are introduced into a copolymer having an alicyclic structure, it is possible not only to prevent gelation of the polymer to enhance the solubility in a solvent but also to improve optical properties such as low chromatic dispersion, low water absorbability, and heat resistance of the copolymer.

Suitable specific examples of the monofunctional (meth)acrylic acid ester may include one or more kinds of monofunctional (meth)acrylic acid esters each having an alicyclic structure and selected from the group consisting of isobornyl methacrylate, isobornyl acrylate, cyclohexyl methacrylate, cyclohexyl acrylate, dicyclopentenyl acrylate, dicyclopentenyloxyethyl acrylate, dicyclopentanyl acrylate, dicyclopentenyloxyethyl methacrylate, dicyclopentenyloxyethyl methacrylate, and dicyclopentanyl methacrylate, in view of costs, prevention of gelation, and the molding proccessability of a polymer to be obtained.

2,4-Diphenyl-4-methyl-1-pentene (c) serves as a chain transfer agent and controls the molecular weight of the copolymer. The molecular weight of the copolymer used as the component (A) in the present invention ranges, as a weight-average molecular weight Mw, from 2,000 to 20,000, preferably from 3,000 to 10,000. When a copolymer having a relatively low molecular weight is used, the moldability and mold release property of the resin composition are improved.

In addition, in order to improve the solubility in a solvent and proccessability of the copolymer, a monofunctional (meth)acrylic acid ester having no alicyclic structure may be added as a component (d). Examples of such (meth)acrylic acid ester include methyl methacrylate, ethyl methacrylate, 2-hydroxyethyl methacrylate, methyl acrylate, ethyl acrylate, n-butyl acrylate, 2-methylhexyl acrylate, 2-ethylhexyl acrylate, and octyl acrylate. Of those, methyl methacrylate and n-butyl acrylate are preferred. Those (meth)acrylic acid monomers may be used alone or in combination of two or more kinds thereof. The (meth)acrylic acid ester is most preferably one or more kinds of (meth)acrylic acid esters selected from the group consisting of methyl methacrylate, 2-hydroxyethyl methacrylate, methyl acrylate, and n-butyl acrylate.

Further, the amount of the structural unit derived from the other monomer component (d) is preferably set within the range of less than 30 mol % with respect to the total amount of the structural unit derived from the monomer component (a) and the structural unit derived from the monomer component (b).

The copolymer used as the component (A) has the structural unit (b1) having a reactive (meth)acrylate group derived from the bifunctional (meth)acrylic acid ester (b) in a side chain. The mole fraction $M_{b1}$ of the structural unit (b1) represented by the equation (2) is preferably 0.05 or more, more preferably 0.1 to 0.3.

$$M_{b1}=(b1)[(a)+(b)] \qquad (2)$$

Here, (b1) in the equation represents a mole number of the structural unit (b1) containing a (meth)acrylate group. When the above-mentioned mole fraction is satisfied, it is possible to produce a molded article which has high light or heat curability and has excellent heat resistance and mechanical properties after curing.

Although a method of producing the copolymer is not particularly limited, the copolymer is produced by polymerizing 2,4-diphenyl-4-methyl-1-pentene (c), the monofunctional acrylic acid ester aromatic compound (a), and the bifunctional (meth)acrylic acid ester (b), whose amounts are adjusted so as to achieve desired contents, at a temperature of 20 to 200° C. with the use of a radical polymerization initiator and a solvent if necessary, and is collected by a usual method such as a steam stripping method or precipitation with a poor solvent.

Next, the component (B) is described.

A polyfunctional (meth)acrylate is used as the component (B). The polyfunctional (meth)acrylate has two or more (meth)acryloyl groups in a molecule, and one kind or two or more kinds of polyfunctional (meth)acrylates are used. When the polyfunctional (meth)acrylate used as the component (B) is used in combination with the component (A), it is possible to synergistically improve heat resistance as well as optical properties such as low chromatic dispersion and high light transmittance.

The polyfunctional (meth)acrylate is preferably one copolymerizable with the component (A). Examples thereof include monomers such as 1,4-butanediol di(meth)acrylate, 1,6-hexanediol di(meth)acrylate, 1,9-nonanediol di(meth)acrylate, tricyclodecanedimethanol(meth)acrylate, bisphenol A polyethoxy di(meth)acrylate, bisphenol A polypropoxy di(meth)acrylate, bisphenol F polyethoxy di(meth)acrylate, ethylene glycol di(meth)acrylate, trimethylolpropanetrioxyethyl(meth)acrylate, tris(2-hydroxyethyl)isocyanurate tri(meth)acrylate, pentaerythritol tri(meth)acrylate, pentaerythritol tetra(meth)acrylate, dipentaerythritol hexa(meth)acrylate, polyethylene glycol di(meth)acrylate, tris(acryloxyethyl)isocyanurate, pentaerythritol tetra(meth)acrylate, dipentaerythritol hexa(meth)acrylate, dipentaerythritol penta(meth)acrylate, tripentaerythritol hexa(meth)acrylate, tripentaerythritol penta(meth)acrylate, neopentyl glycol hydroxypivalate di(meth)acrylate, a di(meth)acrylate of an ε-caprolactone adduct of neopentyl glycol hydroxypivalate (e.g., KAYARAD HX-220 and HX-620 manufactured by NIPPON KAYAKU Co., Ltd.), trimethylolpropane tri(meth)acrylate, trimethylolpropane polyethoxy tri(meth)acrylate, and ditrimethylolpropane tetra(meth)acrylate. Of those, 1,6-hexanediol di(meth)acrylate, trimethylolpropane tri(meth)acrylate, trimethylolpropanetrioxyethyl(meth)acrylate, and pentaerythritol tri(meth)acrylate are particularly preferred.

Further, in the present invention, as another copolymerization component (D), one or more kinds of monofunctional (meth)acrylates each having one (meth)acryloyl group in a molecule may be used. When the monofunctional (meth) acrylates are used in combination with the component (A), it is possible to synergistically improve optical properties such as low chromatic dispersion and high light transmittance simultaneously and to increase flowability, resulting in improving moldability. The use amount is 0 to 40 parts by weight, preferably 0 to 20 parts by weight with respect to 100 parts by weight of the component (A). If the use amount is too large, the flowability becomes too high, resulting in frequent occurrence of molding defects such as burr and leakage, which is not preferred.

The monofunctional (meth)acrylate which may be used as the copolymerization component (D) is preferably the monofunctional (meth)acrylic acid ester (a) having an alicyclic structure used for the production of the copolymer as the component (A). Other examples thereof may include acryloyl morpholine, 2-hydroxyethyl(meth)acrylate, 2-hydroxypropyl(meth)acrylate, 4-hydroxybutyl(meth)acrylate, polyethylene glycol mono(meth)acrylate, polypropylene glycol mono(meth)acrylate, cyclohexane-1,4-dimethanol mono (meth)acrylate, tetrahydrofurfuryl(meth)acrylate, phenoxyethyl(meth)acrylate, phenyl polyethoxy(meth)acrylate, 2-hydroxy-3-phenyloxypropyl(meth)acrylate, o-phenylphenol monoethoxy(meth)acrylate, o-phenylphenol polyethoxy (meth)acrylate, p-cumylphenoxyethyl(meth)acrylate, isobornyl(meth)acrylate, tribromophenyloxyethyl(meth) acrylate, dicyclopentanyl(meth)acrylate, dicyclopentenyl (meth)acrylate, and dicyclopentenyloxyethyl(meth)acrylate.

Next, the component (C) is described.

Examples of the photopolymerization initiator for the component (C) include: benzoins such as benzoin, benzoin methyl ether, benzoin ethyl ether, benzoin propyl ether, and benzoin isobutyl ether; acetophenones such as acetophenone, 2,2-diethoxy-2-phenylacetophenone, 2,2-diethoxy-2-phenylacetophenone, 1,1-dichloroacetophenone, 2-hydroxy-2-methyl-phenylpropan-1-one, diethoxyacetophenone, 1-hydroxycyclohexyl phenyl ketone, and 2-methyl-1-[4-(methylthio)phenyl]-2-morpholinopropan-1-one; anthraquinones such as 2-ethylanthraquinone, 2-tert-butylanthraquinone, 2-chloroanthraquinone, and 2-amylanthraquinone; thioxanthones such as 2,4-diethylthioxanthone, 2-isopropylthioxanthone, and 2-chlorothioxanthone; ketals such as acetophenone dimethyl ketal and benzyl dimethyl ketal; benzophenones such as benzophenone, 4-benzoyl-4'-methyldiphenyl sulfide, and 4,4'-bismethylaminobenzophenone; and phosphine oxides such as 2,4,6-trimethylbenzoyldiphenylphosphine oxide and bis(2,4,6-trimethylbenzoyl)-phenylphosphine oxide.

Those initiators may be used alone or as a mixture of two or more kinds thereof, and may be used in combination with a promoter such as: a tertiary amine such as triethanolamine or methyl diethanolamine; or a benzoic acid derivative such as ethyl N,N-dimethylaminobenzoate or isoamyl N,N-dimethylaminobenzoate.

The curable resin composition of the present invention includes the component (A), the component (B), and the component (C), and the content ratio of the components are as follows. The blending amount of the component (B) is 5 to 250 parts by weight, preferably 20 to 100 parts by weight with respect to 100 parts by weight of the component (A). The blending amount of the component (C) is 0.1 to 10 parts by weight, preferably 1.0 to 5 parts by weight with respect to a total of 100 parts by weight of the blending amount of the component (B) and the blending amount of the component (A).

From another point of view, the curable resin composition preferably contains 30 to 89 wt % of the component (A), 10 to 70 wt % of the component (B), and 0.1 to 10 wt % of the the component (C) with respect to the total of the component (A) and component (B). The composition more preferably contains 35 to 80 wt % of the component (A) and 10 to 40 wt % of the component (B). When the blending ratios of the component (A), the component (B), and the component (C) are in the above-mentioned ranges, it is possible to synergistically improve a property balance between the moldability such as mold release property or curability and the heat resistance and optical properties. In addition, if the amount of the component (C) is too small, insufficient curing is liable to occur to reduce the heat resistance and light resistance, while if the amount of the component (C) is too large, the mechanical strength may decrease or the heat resistance may decrease. It should be noted that, in the case where the curable resin composition includes an organic solvent and a filler, the above-mentioned contents are calculated from amounts excluding the amounts of the organic solvent and the filler.

Further, if necessary, a polymerization inhibitor, an antioxidant, a mold release agent, a photosensitizer, an organic solvent, a silane coupling agent, a leveling agent, an antifoamer, an antistat, an ultraviolet absorber, a light stabilizer, various inorganic and organic fillers, a fungicide, or an antimicrobial may be added to the curable resin composition of the present invention to impair intended functions.

The curable resin composition of the present invention can be obtained by mixing the component (A), the component (B), the component (C), and optionally another component in any order. The curable resin composition of the present invention is stable over time.

When the curable resin composition of the present invention is irradiated with an active energy ray such as UV light, a cured product can be obtained. Here, specific examples of a light source used in curing by irradiation with the active energy ray may include a xenon lamp, a carbon arc, a sterilization lamp, a fluorescent light for UV light, a high-pressure mercury vapor lamp for copying, a medium-pressure mercury lamp, a high-pressure mercury lamp, an ultra-high-pressure mercury lamp, an electrodeless lamp, a metal halide lamp, and an electron beam generated from a scanning or curtain electron beam accelerator. Further, in the case where the curable resin composition of the present invention is cured by irradiation with UV light, the irradiation amount of UV light necessary for curing may be about 300 to 20,000 mJ/cm$^2$. It should be noted that, in order to cure the resin composition sufficiently, it is desirable to irradiate the composition with an active energy ray such as UV light in an atmosphere of an inert gas such as nitrogen gas.

The curable resin composition of the present invention can be used in a cast article such as a plastic lens. As a method of preparing a plastic lens using the resin composition of the present invention, there may be employed, for example, a method involving: making a mold using a gasket made of a polyvinyl chloride, ethylene vinyl acetate copolymer or the like and two glass molds having a desired shape; injecting the resin composition of the present invention into the mold; irradiating the mold with an active energy ray such as UV light to cure the resin composition; and releasing the cured product from the mold.

Further, as a method of applying the curable resin composition of the present invention onto a film-type substrate as a resin composition for a prism lens sheet, various methods known in the art may be employed. Specific examples of the method include a method involving: applying a resin composition onto a mold having a prism lens shape on its surface to provide a resin composition layer; pressure-bonding a colorless transparent film-type substrate (such as polyvinyl chloride, polystyrene, polycarbonate, poly(meth)acrylate, polyester, or polyethylene terephthalate) on the resin composition layer while preventing air bubbles from entering between the layer and the substrate; irradiating the composition with UV light using a high-pressure mercury lamp from the film-type substrate side to cure the resin composition layer; and peeling the film-type substrate having the prism lens-like resin layer formed thereon from the mold.

The cured product of the resin composition for an optical material of the present invention, which is obtained by irradiation with an active energy ray such as UV light, has a refractive index of preferably 1.49 or more at 25° C., more preferably 1.51 or more at 25° C. In particular, in the case where a prism lens sheet is prepared with the resin composition for an optical material of the present invention, when the cured product has a refractive index of less than 1.49 at 25° C., there may arise a problem in that sufficient front brightness cannot be maintained.

Meanwhile, the cured product has an Abbe's number of preferably 40.0 or more, more preferably 50.0 or more. When the cured product has an Abbe's number of less than 40.0, color bleeding occurs owing to large chromatic aberration, which is not preferred.

The resin cured product obtained by molding and curing the curable resin composition of the present invention is excellent as an optical material. The resin cured product is particularly useful as a material for an optical plastic lens such as a prism lens sheet, a Fresnel lens, a lenticular lens, a lens for eyewear, or an aspheric lens. Further, such lens is advantageously used in an imaging device. In addition, the curable resin composition or the resin cured product may also be used in applications for optoelectronics such as an optical disc, an optical fiber, or an optical waveguide, a print ink, a coating material, a clear coating agent, a varnish, and the like.

EXAMPLES

Hereinafter, the present invention is described in more detail by way of examples. However, the present invention is not limited by the examples. It should be noted that, in measurement of molecular weights, molecular weight distributions, and the like in synthesis examples, sample preparation and measurement were carried out by the following methods.

(1) Molecular Weight and Molecular Weight Distribution of Polymer

Measurement of the molecular weight and molecular weight distribution of a soluble polyfunctional vinyl copolymer having an alicyclic structure was carried out by GPC (manufactured by Tosoh Corporation, HLC-8120 GPC) using tetrahydrofuran (THF) as a solvent at a flow rate of 1.0 ml/min at a column temperature of 40° C. The molecular weight of a copolymer was measured as a molecular weight in terms of polystyrene using a calibration curve created by using monodisperse polystyrene.

(2) Structure of Polymer

The structure of a polymer was determined by 13C-NMR and 1H-NMR analyses and an elemental analysis using a nuclear magnetic resonance spectrometer manufactured by JEOL Ltd., type JNM-LA 600. Chloroform-d1 was used as a solvent, and a resonance line of tetramethylsilane was used as an internal standard.

(3) Preparation of Test Piece for Measurement of Physical Properties

Two glass plates each having a width of 50 mm, a length of 50 mm, and a thickness of 1.0 mm were fixed by winding a polyimide tape on the outer periphery so that a space between the plates was 0.2 to 1.0 mm to prepare a glass mold, and a curable composition was injected thereinto and cured by 1) irradiating the glass mold from one side with UV light for 5 seconds using the above-mentioned high-pressure mercury lamp or 2) placing the glass mold in an inert gas oven under a nitrogen gas stream and heating the mold at 180° C. for 1 hour. The cured resin plate was released from the glass mold and used in measurement of physical properties.

(4) Measurement of Refractive Index

Refractive indices and Abbe's numbers at 589 nm were measured using an Abbe refractometer (manufactured by Atago Co., Ltd.).

(5) Hue (YI); Measurement was carried out for a flat plate with a thickness of 1.0 mm using a colorimeter (trade name "MODEL TC-8600," manufactured by Tokyo Denshoku CO., LTD.) to determine its YI value.

(6) Haze (Turbidity Degree) and Total Light Transmittance

A test piece having a thickness of 0.2 mm was prepared, and the haze (turbidity degree) and total light transmittance of the sample were measured using an integrating sphere-type light transmittance measurement apparatus (manufactured by "Nippon Denshoku Industries, Co., Ltd.," SZ-Σ90).

(7) Mold release property: The mold release property was evaluated based on difficulty in release of a cured resin from a mold.

○ . . . Good mold release property
  Δ . . . Slightly difficult mold release
  x . . . Difficult mold release or remaining resin in mold (8) Mold reproducibility: The surface shape of a cured resin layer and the surface shape of a mold were observed.

○ . . . Good reproducibility
  Δ . . . Good reproducibility under some curing conditions (light and heat)
  x . . . Not good reproducibility (9) Burr, leakage: Evaluation was carried out based on the size of a burr generated at a part other than the molded article itself and the degree of leakage of the resin in a mold clearance when the cured resin was released from a mold.

○ . . . The amount of a burr generated is less than 0.05 mm, and the leakage of the resin in a mold clearance is less than 1.0 mm.
  Δ . . . The amount of a burr generated is 0.05 mm or more and less than 0.2 mm, and the leakage of the resin in a mold clearance is 1.0 mm or more and less than 3.0 mm.
  x . . . The amount of a burr generated is 0.2 mm or more, and the leakage of the resin in a mold clearance is 3.0 mm or more.

(10) Air bubbles: Evaluation was carried out based on the presence or absence and the degree of the sizes of air bubbles generated on the molded article itself when the cured resin was released from a mold.

○ . . . No air bubbles are observed.
  Δ . . . Air bubbles are observed, and the sizes of the air bubbles are less than 2% with respect to the volume of the molded article.
  x . . . Air bubbles are observed, and the sizes of the air bubbles are 2% or more with respect to the volume of the molded article.

(11) Crack: Evaluation was carried out based on the presence or absence and the degree of the size of a crack generated in the molded article itself when the cured resin was released from a mold.

○ . . . No crack is observed.

Δ . . . Cracks are observed, but the cracks are observed only at a corner part of the periphery of the molded article.

× . . . Cracks are observed, and are observed not only at a corner part of the periphery of the molded article but also at a part other than the corner part.

(12) Ref low heat resistance: A parallel flat plate having a thickness of 1 mm was used as a test piece to measure a spectral transmittance at a wavelength of 400 nm using a spectrophotometric colorimeter CM-3700d (manufactured by Konica Minolta Holdings, Inc.). The measurement was carried out before a heat resistance test where postcuring was carried out at 190° C. for 60 minutes and after a heat resistance test performed in an air oven at 260° C. for 8 minutes.

(13) Water Absorption Rate

A parallel flat plate having a thickness of 1 mm was used as a test piece, and the weight of the test sample which had been vacuum-dried at 60° C. for 24 hours was defined as "Wo" and measured using a scale capable of measuring the sample at a precision of ±0.1 mg. The plate was humidified in a thermo-hygrostat at a temperature of 85° C. and a relative humidity of 85% for 1 week. After humidification, water on the test sample was wiped off, and the weight of the sample was measured using a scale capable of measuring the sample at a precision of ±0.1 mg and was defined as "W". The water absorption rate was calculated based on the following equation (1). The same three test samples were prepared and subjected to the test in the same manner as above.

$$Wo/W \times 100 = \text{Water absorption rate} \quad (1)$$

(14) Solubility Test 1 g of a copolymer was added to 100 ml of each of various organic solvents (toluene, xylene, tetrahydrofuran, dichloroethane, and chloroform) at 25° C., and the mixture was stirred using a magnetic stirrer for 30 minutes, followed by visual observation to confirm the solubility. When a copolymer was dissolved in all the organic solvents and did not gelate, its solubility was represented by Symbol "○".

Description of Abbreviations

DMTCDA: dimethyloltricyclodecane diacrylate
BDDA: 1,4-butanediol diacrylate
IBMA: isobornyl methacrylate
CHMA: cyclohexyl methacrylate
DCPMA: dicyclopentanyl methacrylate
DPMP: 2,4-diphenyl-4-methyl-1-pentene Synthesis Example 1

4.0 mol (1,158.1 ml) of DMTCDA, 6.0 mol (1,360.6 ml) of IBMA, 12.0 mol (2,864.8 ml) of DPMP, and 2,000 ml of toluene were loaded into a 10.0-L reaction container, 100 mmol of benzoyl peroxide were added thereto at 90° C., and the mixture was allowed to react for 6 hours. The polymerization reaction was stopped by cooling, and the reaction mixture was loaded into a large amount of methanol at room temperature to precipitate a polymer. The resultant copolymer was washed with methanol, separated by filtration, and dried, to thereby obtain 931.2 g of a copolymer A (yield: 36.5 wt %).

The resultant copolymer A was found to have an Mw of 4,020 and an Mn of 2,260 and have 37.2 mol % of a structural unit derived from DMTCDA (structural unit b) and 63.8 mol % of a structural unit derived from IBMA (structural unit a). Of those, the mole fraction ($M_{b1}$) of a structural unit (structural unit b1) containing a reactive acrylate group derived from DMTCDA in a side chain was 25.6%, and the mole fraction (Mc) of the end group of a structure derived from DPMP was 11.5 mol %. It should be noted that $M_{b1}$ is a mole fraction calculated by the equation (2), and Mc is a mole fraction calculated by the equation (1). The structural units a and b represent a structural unit derived from the monofunctional (meth)acrylic acid ester (a) having an alicyclic structure and a structural unit derived from the bifunctional (meth)acrylic acid ester (b), respectively, and the amounts thereof are calculated based on their total amount defined as 100. Solubility: ○.

Synthesis Example 2

2.0 mol (579.0 ml) of DMTCDA, 8.0 mol (1,814.1 ml) of IBMA, 6.0 mol (1,432.4 ml) of DPMP, and 2,000 ml of toluene were loaded into a 10.0-L reaction container, 100 mmol of benzoyl peroxide were added thereto at 90° C., and the mixture was allowed to react for 6 hours. The subsequent procedure was carried out in the same manner as in Synthesis Example 1, to thereby obtain 1,500.1 g of a copolymer B (yield: 62.9 wt %)

The copolymer B was found to have an Mw of 3,590, an Mn of 1,970, and an Mw/Mn of 1.82, have 18.9 mol % of the structural unit b and 81.1 mol % of the structural unit a, and have a mole fraction ($M_{b1}$) of 12.1% and a mole fraction (Mc) of 6.5 mol %. Solubility: ○.

Synthesis Example 3

4.4 mol (1273.9 ml) of DMTCDA, 6.6 mol (1,149.5 ml) of CHMA, 8.8 mol (2,100.9 ml) of DPMP, and 2,200 ml of toluene were loaded into a 10.0-L reaction container, 110 mmol of benzoyl peroxide were added thereto at 90° C., and the mixture was allowed to react for 6 hours. The subsequent procedure was carried out in the same manner as in Synthesis Example 1, to thereby obtain 1,046.1 g of a copolymer C (yield: 41.0 wt %).

The copolymer C was found to have an Mw of 4,450, an Mn of 2,570, and an Mw/Mn of 1.73, have 38.1 mol % of the structural unit b and 61.9 mol % of the structural unit a derived from CHMA, and have a mole fraction ($M_{b1}$) of 24.8% and a mole fraction (Mc) of 12.1 mol %. Solubility: ○.

Synthesis Example 4

3.0 mol (565.7 ml) of BDDA, 7.0 mol (1,482.8 ml) of DCPMA, 3.0 mol (716.2 ml) of DPMP, and 2,200 ml of toluene were loaded into a 10.0-L reaction container, 100 mmol of benzoyl peroxide were added thereto at 90° C., and the mixture was allowed to react for 5 hours. The subsequent procedure was carried out in the same manner as in Synthesis Example 1, to thereby obtain 1,388.5 g of a copolymer D (yield: 65.0 wt %)

The copolymer D was found to have an Mw of 9,830, an Mn of 3,210, and an Mw/Mn of 3.06, have 28.2 mol % of the structural unit b derived from BDDA and 71.8 mol % of the structural unit a derived from DCPMA, and have a mole fraction ($M_{b1}$) of 15.8% and a mole fraction (Mc) of 9.20 mol %. Solubility: ○.

Synthesis Example 5

5.0 mol (942.9 ml) of BDDA, 5.0 mol (1,059.1 ml) of DCPMA, 5.0 mol (1,193.7 ml) of DPMP, and 2,200 ml of toluene were loaded into a 10.0-L reaction container, 100 mmol of benzoyl peroxide were added thereto at 90° C., and the mixture was allowed to react for 7 hours. The subsequent procedure was carried out in the same manner as in Synthesis Example 1, to thereby obtain 1,246.5 g of a copolymer E (yield: 59.6 wt %).

The copolymer E was found to have an Mw of 8,820, an Mn of 2,800, and an Mw/Mn of 3.15, have 46.5 mol % of the structural unit b derived from BDDA and 53.5 mol % of the structural unit a derived from DCPMA, and have a mole fraction ($M_{b1}$) of 27.2% and a mole fraction (Mc) of 15.2 mol %. Solubility: ○.

Synthesis Example 6

6.07 mol (608.0 g) of methyl methacrylate, 1.46 mol (152.0 g) of styrene, and n-dodecyl mercaptan (0.5 wt % (3.8 g) with respect to the total amount of methyl methacrylate and styrene) were charged and allowed to polymerize at a temperature of 106° C. while a nitrogen gas was introduced until a viscosity measured by a Gardner bubble viscometer (25° C.) of S was achieved. Then, hydroquinone was added thereto at a concentration of 50 ppm with respect to the total amount of the charged components, and the mixture was rapidly cooled to 80° C. or less to stop the polymerization. Further, 40 g of 1,6-hexanediol dimethacrylate were added thereto, to thereby obtain a resin composition. 0.5 g of t-butyl peroxyneodecanoate was added as a curing catalyst to 50 g of the resin composition, to thereby obtain a curable composition A. The solubility of the curable composition A was found to be "○".

Synthesis Example 7

2.0 mol (579.0 ml) of DMTCDA, 8.0 mol (1,814.1 ml) of IBMA, 2.0 mol (404.8 ml) of t-dodecyl mercaptan, and 2,000 ml of toluene were loaded into a 10.0-L reaction container, 10 mmol of benzoyl peroxide were added thereto at 80° C., and the mixture was allowed to react for 10 minutes. The polymerization reaction product was cooled to 50° C., and toluene used as a solvent was distilled off, followed by cooling to room temperature, to thereby obtain 2,326.4 g of a copolymer F (yield: 97.2 wt %).

The copolymer F was found to have an Mw of 3,240, an Mn of 487, and an Mw/Mn of 6.7, have 20.1 mol % of the structural unit b derived from DMTCDA and 79.9 mol % of the structural unit a derived from IBMA, and have a mole fraction ($M_{b1}$) of 11.6%. Solubility: ○.

Synthesis Example 8

5.7 mol (811.8 ml) of divinyl benzene, 0.30 mol (42.7 ml) of ethyl vinyl benzene, 2.0 mol (229.2 ml) of styrene, 0.02 mol (2.7 ml) of 1-chloroethylbenzene, and 17,120 ml of dichloroethane were loaded into a 30-L reaction container, 0.029 mol of tin tetrachloride was added at 70° C., and the mixture was allowed to react for 3 hours. The polymerization reaction was stopped with 13.0 g of calcium hydroxide, and the mixture was filtrated, followed by washing with 5 L of distilled water three times. 1.0 g of butyl hydroxy toluene was dissolved in the polymerization solution, and the resultant solution was concentrated at 60° C. for 1 hour using an evaporator. The subsequent procedure was carried out in the same manner as in Synthesis Example 1, to thereby obtain 542.1 g of a copolymer G (yield: 54.8 wt %).

The copolymer G was found to have an Mw of 28,600, an Mn of 5,140, and an Mw/Mn of 5.56, and resonance lines attributed to the chlorine end and indan end were observed. In addition, the copolymer was found to have a total of 48.1 mol % of a structural unit derived from divinyl benzene and a total of 51.9 mol % of a structural unit derived from styrene and a structural unit derived from ethyl vinyl benzene. Solubility: ○.

Examples 1 to 19 and Comparative Examples 1 to 6

Components were blended at the ratios shown in Tables 1 to 3 (the numerical values represent parts by weight), and 0.2 part by weight of ADEKA STAB AO-60 and 0.1 part by weight of ADEKA STAB AO-412S manufactured by Adeka Corporation were added as stabilizers, to thereby obtain curable resin compositions. Next, the curable resin compositions were cured by the above-mentioned various test methods, and their performances were evaluated. Tables 4 to 6 show the results of evaluation of the performances.

Description of Symbols in Tables 1.6HX; 1,6-hexanediol dimethacrylate (manufactured by KYOEISHA CHEMICAL CO., LTD.)
1.9ND; 1,9-nonanediol dimethacrylate (manufactured by KYOEISHA CHEMICAL CO., LTD.)
DCP-A; tricyclodecanedimethanol diacrylate (manufactured by KYOEISHA CHEMICAL CO., LTD.)
IB-X; isobornyl methacrylate (manufactured by KYOEISHA CHEMICAL CO., LTD.)
IB-XA; isobornyl acrylate (manufactured by KYOEISHA CHEMICAL CO., LTD.)
EG; ethylene glycol dimethacrylate (manufactured by KYOEISHA CHEMICAL CO., LTD.)
FA-513AS; dicyclopentanyl acrylate (manufactured by Hitachi Chemical CO., Ltd.)
FA-512AS; dicyclopentenyloxyethyl acrylate (manufactured by Hitachi Chemical Co., Ltd.)
FA-513M; dicyclopentanyl methacrylate (manufactured by Hitachi Chemical Co., Ltd.)
TMPTA; trimethylolpropane triacrylate (manufactured by DAICEL-CYTEC Company LTD.)
PO-A: phenoxyethyl acrylate (manufactured by KYOEISHA CHEMICAL CO., LTD.)
Perbutyl O; t-butyl peroxy-2-ethylhexanoate (manufactured by NOF CORPORATION)
Irgacure 184; 1-hydroxycyclohexyl phenyl ketone (manufactured by Ciba Specialty Chemicals Inc.)

TABLE 1

|  | Example | | | | | | | | |
|---|---|---|---|---|---|---|---|---|---|
|  | 1 | 2 | 3 | 4 | 5 | 6 | 7 | 8 | 9 |
| Component A | | | | | | | | | |
| Copolymer A | 55 | | | | | | | | |
| Copolymer B | | 55 | | 40 | 40 | 55 | 55 | 55 | 55 |
| Copolymer C | | | 55 | | | | | | |
| Component B | | | | | | | | | |
| 1.9ND | 25 | 20 | 25 | 25 | 25 | 25 | 20 | 5 | 20 |
| 1.6HX | 20 | 25 | 20 | | | 20 | | | |
| TMPTA | | | | 5 | 5 | | 5 | 20 | 5 |
| Others | | | | | | | | | |
| IB-X | | | | 30 | | | | | |
| IB-XA | | | | | 30 | | | | |
| FA-513AS | | | | | | | 20 | | |
| FA-513M | | | | | | | | 20 | |
| FA-512AS | | | | | | | | | 20 |
| Component C | | | | | | | | | |
| Perbutyl O | 1 | 1 | 1 | 1 | 1 | 1 | 1 | 1 | 1 |
| Irgacure 184 | | | | | | 2 | | | |

TABLE 2

| | Example | | | | | | | | | |
|---|---|---|---|---|---|---|---|---|---|---|
| | 10 | 11 | 12 | 13 | 14 | 15 | 16 | 17 | 18 | 19 |
| Component A | | | | | | | | | | |
| Copolymer B | 55 | 55 | 55 | | | | | | 30 | 90 |
| Copolymer D | | | | 60 | | | 60 | | | |
| Copolymer E | | | | | 70 | 60 | | 50 | | |
| Component B | | | | | | | | | | |
| 1.9ND | 20 | 20 | 20 | 20 | 10 | 10 | 10 | 10 | 20 | |
| DCP-A | | | 20 | | | 20 | 20 | 20 | 20 | 50 |
| EG | | | | | | | | | | 5 |
| TMPTA | 5 | | 5 | 5 | | | | 5 | | |
| Others | | | | | | | | | | |
| IB-X | 20 | | | | | | | | | |
| IB-XA | | 20 | | | | | | | | |
| FA-513AS | | | | | | | 10 | | | 5 |
| FA-513M | | | | 15 | 20 | 10 | | 15 | | |
| Component C | | | | | | | | | | |
| Perbutyl O | 1 | | 1 | 1 | 1 | 0.5 | 0.5 | 0.5 | 0.5 | 0.5 |
| Irgacure 184 | | | | | | 2 | 2 | 1 | 2 | 2 |

TABLE 3

| | Comparative Example | | | | | |
|---|---|---|---|---|---|---|
| | 1 | 2 | 3 | 4 | 5 | 6 |
| Component A | | | | | | |
| Copolymer B | | | | | 10 | 95 |
| Curable composition A | | 100 | | | | |
| Copolymer F | | | 55 | | | |
| Copolymer G | | | | 55 | | |
| Component B | | | | | | |
| 1.9ND | 25 | | 20 | 20 | 40 | |
| 1.6HX | 20 | | | | | |
| DCP-A | | | | | 50 | |
| TMPTA | | | 5 | 5 | | |
| Others | | | | | | |
| IB-X | 55 | | | | | |
| FA-513AS | | | 20 | 20 | | 5 |
| Component C | | | | | | |
| Perbutyl O | 1 | | 1 | 1 | 0.5 | 0.5 |
| Irgacure 184 | | | | | 2 | 2 |

TABLE 4

| | Example | | | | | | | | |
|---|---|---|---|---|---|---|---|---|---|
| | 1 | 2 | 3 | 4 | 5 | 6 | 7 | 8 | 9 |
| Refractive index (589 nm) | 1.519 | 1.511 | 1.523 | 1.516 | 1.525 | 1.520 | 1.517 | 1.516 | 1.512 |
| Abbe's number | 52.0 | 52.7 | 51.5 | 53.5 | 51.3 | 52.3 | 53.1 | 52.7 | 53.4 |
| YI | 0.91 | 0.96 | 1.21 | 1.32 | 1.34 | 1.08 | 1.03 | 0.92 | 0.98 |
| Haze (%) | 0.32 | 0.27 | 0.23 | 0.36 | 0.22 | 0.24 | 0.21 | 0.21 | 0.22 |
| Total light transmittance (%) | 92.1 | 92.0 | 91.8 | 91.7 | 92.3 | 92.3 | 92.2 | 92.6 | 92.1 |
| Mold release property | ○ | ○ | ○ | ○ | ○ | ○ | ○ | ○ | ○ |
| Mold reproducibility | ○ | ○ | ○ | ○ | ○ | ○ | ○ | ○ | ○ |
| Burr, leakage | ○ | ○ | ○ | ○ | ○ | ○ | ○ | ○ | ○ |
| Air bubbles | ○ | ○ | ○ | ○ | ○ | ○ | ○ | ○ | ○ |
| Crack | ○ | ○ | ○ | ○ | ○ | ○ | ○ | ○ | ○ |
| Spectral transmittance (%) | | | | | | | | | |
| Before heat resistance test | 89.1 | 88.9 | 88.5 | 89.3 | 88.6 | 89.0 | 89.4 | 87.4 | 89.3 |
| After heat resistance test | 86.7 | 87.1 | 85.9 | 86.9 | 85.3 | 87.1 | 85.7 | 84.9 | 79.6 |
| Water absorption rate (%) | 0.67 | 0.66 | 0.58 | 0.71 | 0.63 | 0.64 | 0.71 | 0.73 | 0.73 |

TABLE 5

| | Example | | | | | | | | | |
|---|---|---|---|---|---|---|---|---|---|---|
| | 10 | 11 | 12 | 13 | 14 | 15 | 16 | 17 | 18 | 19 |
| Refractive index (589 nm) | 1.496 | 1.501 | 1.524 | 1.522 | 1.512 | 1.523 | 1.525 | 1.521 | 1.521 | 1.513 |
| Abbe's number | 55.1 | 55.7 | 51.2 | 52.4 | 52.8 | 53.6 | 53.9 | 52.1 | 51.3 | 54.0 |
| YI | 0.96 | 1.01 | 0.97 | 0.99 | 0.92 | 0.96 | 1.01 | 0.96 | 0.92 | 0.89 |
| Haze (%) | 0.23 | 0.17 | 0.26 | 0.22 | 0.26 | 0.25 | 0.31 | 0.36 | 0.16 | 0.21 |
| Total light transmittance (%) | 91.8 | 92.3 | 91.9 | 92.6 | 92.2 | 92.3 | 92.4 | 92.7 | 92.3 | 92.7 |
| Mold release property | ○ | ○ | ○ | ○ | ○ | ○ | ○ | ○ | Δ | ○ |

TABLE 5-continued

| | Example | | | | | | | | | |
|---|---|---|---|---|---|---|---|---|---|---|
| | 10 | 11 | 12 | 13 | 14 | 15 | 16 | 17 | 18 | 19 |
| Mold reproducibility | ○ | ○ | ○ | ○ | ○ | ○ | ○ | ○ | ○ | Δ |
| Burr, leakage | ○ | ○ | ○ | ○ | ○ | ○ | ○ | ○ | Δ | ○ |
| Air bubbles | ○ | ○ | ○ | ○ | ○ | ○ | ○ | ○ | ○ | ○ |
| Crack | ○ | ○ | ○ | ○ | ○ | ○ | ○ | ○ | ○ | ○ |
| Spectral transmittance (%) | | | | | | | | | | |
| Before heat resistance test | 88.5 | 89.1 | 88.6 | 90.5 | 89.7 | 88.2 | 88.7 | 88.1 | 89.1 | 89.3 |
| After heat resistance test | 85.9 | 87.3 | 84.2 | 87.9 | 87.3 | 87.2 | 85.1 | 86 | 86.5 | 87.1 |
| Water absorption rate (%) | 0.68 | 0.66 | 0.71 | 1.02 | 0.68 | 0.61 | 0.72 | 0.92 | 0.87 | 0.92 |

TABLE 6

| | Comparative Example | | | | | |
|---|---|---|---|---|---|---|
| | 1 | 2 | 3 | 4 | 5 | 6 |
| Refractive index (589 nm) | 1.489 | 1.480 | 1.492 | 1.534 | 1.518 | 1.512 |
| Abbe's number | 55.3 | 58.9 | 58.1 | 38.4 | 53.2 | 51.2 |
| YI | 1.48 | 3.67 | 1.65 | 2.42 | 1.22 | 2.38 |
| Haze (%) | 0.52 | 1.54 | 0.89 | 0.41 | 0.28 | 2.44 |
| Total light transmittance (%) | 91.3 | 88.2 | 89.9 | 89.5 | 91.1 | 88.3 |
| Mold release property | X | X | X | ○ | X | ○ |
| Mold reproducibility | X | X | X | ○ | X | X |
| Burr, leakage. | X | X | X | ○ | X | ○ |
| Air bubbles | ○ | X | ○ | ○ | ○ | X |
| Crack | ○ | ○ | ○ | ○ | X | X |
| Spectral transmittance (%) | | | | | | |
| Before heat resistance test | 87.3 | 84.2 | 86.3 | 84.3 | 88.3 | 84.3 |
| After heat resistance test | 83.2 | 69.7 | 73.2 | 71.3 | 85.2 | 81.2 |
| Water absorption rate (%) | 1.38 | 1.24 | 1.05 | 0.88 | 1.34 | 1.08 |

INDUSTRIAL APPLICABILITY

A resin cured product obtained from the curable resin composition of the present invention has excellent optical properties, heat resistance, transparency, low water absorbability, and mold release property in molding and reduces the occurrence of a burr from a mold. Therefore, the resin cured product can be efficiently used as a high-performance optical material. Such optical material is suitably used in fields such as an imaging field including an imaging device which is required to have sophisticated optical properties.

The invention claimed is:

1. A curable resin composition, comprising:
a component (A): a soluble polyfunctional (meth)acrylic acid ester copolymer which is obtained by copolymerizing components including a monofunctional (meth)acrylic acid ester (a) having an alicyclic structure, a bifunctional (meth)acrylic acid ester (b), and 2,4-diphenyl-4-methyl-1-pentene (c), has a structural unit (b1) having a reactive (meth)acrylate group derived from the bifunctional (meth)acrylic acid ester (b) in a side chain and a structural unit derived from 2,4-diphenyl-4-methyl-1-pentene (c) at an end, has a weight-average molecular weight of 3000 to 10,000, and is soluble in toluene, xylene, tetrahydrofuran, dichloroethane, or chloroform,
wherein the amount of the structural unit derived from 2.4-diphenyl-4-methyl-1-pentene (c) introduced into the copolymer is, as a mole fraction $M_c$ represented by the following equation (1), 0.03 to 0.30, and the amount of the reactive (meth)acrylate group is, as a mole fraction $M_{b1}$ represented by the following equation (2), 0.1 to 0.3, $$M_c=(c)/[(a)+(b)+(c)] \quad (1)$$

$$M_{b1}=(b1)/[(a)+(b)] \quad (2)$$

wherein, (a), (b), and (c) represent mole numbers of the structural unit derived from the monofunctional (meth)acrylic acid ester (a) having an alicyclic structure, the structural unit derived from the bifunctional (meth)acrylic acid ester (b), and the structural unit derived from 2,4-diphenyl-4-methyl-1-pentene (c), respectively, and (b1) represents a mole number of the structural unit (b1) containing a reactive (meth)acrylate group;
a component (B): a polyfunctional (meth)acrylate; and
a component (C): an initiator,
wherein a blending amount of the component (B) is 5 to 250 parts by weight with respect to 100 parts by weight of the component (A), and a blending amount of the component (C) is 0.1 to 10 parts by weight with respect to a total of 100 parts by weight of the blending amount of the component (B) and a blending amount of the component (A), and
wherein the polyfunctional (meth)acrylate of Component (B) is a monomer having two or more (meth)acryloyl groups in a molecule, the polyfunctional (meth)acrylate monomer being copolymerizable with the Component (A).

2. A curable resin composition according to claim 1, wherein the monofunctional (meth)acrylic acid ester (a) having an alicyclic structure comprises one or more kinds of monofunctional (meth)acrylic acid esters selected from the group consisting of isobornyl methacrylate, isobornyl acrylate, cyclohexyl methacrylate, cyclohexyl acrylate, dicyclopentenyl acrylate, dicyclopentenyloxyethyl acrylate, dicyclopentanyl acrylate, dicyclopentenyloxyethyl methacrylate, dicyclopentenyloxyethyl methacrylate, and dicyclopentanyl methacrylate.

3. A curable resin composition according to claim 1, wherein the bifunctional (meth)acrylic acid ester (b) comprises one or more kinds of bifunctional (meth)acrylic acid esters selected from the group consisting of cyclohexanedimethanol diacrylate and dimethyloltricyclodecane diacrylate.

4. A resin cured product, which is obtained by curing the curable resin composition according to claim 1.

5. An optical material, which is formed from the resin cured product according to claim 4.

6. An optical material according to claim 5, wherein the optical material comprises an optical plastic lens.

7. A resin cured product, which is obtained by curing the curable resin composition according to claim 2.

8. An optical material, which is formed from the resin cured product according to claim 7.

9. An optical material according to claim 8, wherein the optical material comprises an optical plastic lens.

10. A resin cured product, which is obtained by curing the curable resin composition according to claim 3.

11. An optical material, which is formed from the resin cured product according to claim 10.

12. An optical material according to claim 11, wherein the optical material comprises an optical plastic lens.

* * * * *